(12) United States Patent
Blanchard et al.

(10) Patent No.: US 10,753,389 B2
(45) Date of Patent: Aug. 25, 2020

(54) SUSPENSION THRUST BEARING DEVICE

(71) Applicant: Aktiebolaget SKF, Gothenburg (SE)

(72) Inventors: Xavier Blanchard, Saint-Cyr-sur-Loire (FR); Francois De Lemps, Saint-Cyr-sur-Loire (FR); Julien Maffucci, Fondettes (FR); Bruno Montboeuf, Saint-Cyr-sur-Loire (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/559,745

(22) Filed: Sep. 4, 2019

(65) Prior Publication Data
US 2020/0116196 A1    Apr. 16, 2020

(30) Foreign Application Priority Data

Oct. 16, 2018 (DE) .......................... 10 2018 217 666

(51) Int. Cl.
| | |
|---|---|
| *F16C 19/10* | (2006.01) |
| *B60G 13/00* | (2006.01) |
| *B60G 15/06* | (2006.01) |

(52) U.S. Cl.
CPC ............ *F16C 19/10* (2013.01); *B60G 13/003* (2013.01); *B60G 15/068* (2013.01); *B60G 2204/128* (2013.01); *B60G 2204/418* (2013.01); *F16C 2326/05* (2013.01)

(58) Field of Classification Search
CPC .... F16C 19/10; F16C 2326/05; B60G 13/003; B60G 15/068; B60G 2204/128; B60G 2204/418
See application file for complete search history.

(56) References Cited

U.S. PATENT DOCUMENTS

| | | | | |
|---|---|---|---|---|
| 7,364,177 B2* | 4/2008 | Handke | ................ | B60G 15/063 280/124.147 |
| 2002/0009249 A1* | 1/2002 | Beghnini | ............. | B60G 15/063 384/607 |
| 2010/0014792 A1* | 1/2010 | Kellam | ................ | B60G 15/067 384/196 |
| 2011/0262070 A1* | 10/2011 | Zernickel | ............. | B60G 15/068 384/618 |
| 2012/0321238 A1* | 12/2012 | Corbett | ................ | F16C 27/066 384/590 |
| 2016/0059659 A1* | 3/2016 | Bussit | .................... | F16C 27/066 384/611 |
| 2016/0089947 A1* | 3/2016 | Bedeau | .................... | F16C 27/08 248/634 |

* cited by examiner

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A suspension thrust bearing for use with a suspension spring in an automotive suspension strut of a vehicle. The suspension thrust bearing provides a bearing having upper and lower annular bearing members in relative rotation to each other, and having upper and lower bearing surfaces, respectively, disposed in confronting alignment with each other. The lower bearing surface has a contour shaped to axially receive an upper end of the suspension spring. The upper bearing surface is shaped to be axially received by a support block attached to a body of the vehicle. The suspension thrust bearing includes an upper isolator made of resilient material and fixed to the upper bearing surface such that the upper isolator fits between the upper annular bearing member and support block.

11 Claims, 2 Drawing Sheets

SUSPENSION THRUST BEARING DEVICE

CROSS-REFERENCE TO RELATED APPLICATIONS

This application claims priority to German patent application no. 102018217666.3 filed on Oct. 16, 2018, the contents of which are fully incorporated herein by reference.

FIELD OF THE INVENTION

The present invention concerns the field of suspension thrust bearings, in particular of the MacPherson type. Such suspension thrust bearings equip suspension strut for use in a motor vehicle.

BACKGROUND OF THE INVENTION

As a general rule, a motor vehicle suspension system comprises a suspension strut supporting an axle and a vehicle wheel. A suspension thrust bearing is disposed in an upper portion of the suspension strut, opposite to the wheel and the ground, and between a suspension spring and an upper support block attached to the vehicle chassis.

The suspension thrust bearing includes at least one rolling bearing.

The suspension thrust bearing enables transmission of axial forces between the spring and the body of the vehicle and, in the meantime, allows relative angular movement between the spring, which is mobile in rotation, and the fixed support block attached to the body.

To this end, the spring is supported by a spring seat provided on the suspension thrust bearing. More precisely, the suspension thrust bearing comprises a lower bearing surface that axially rests on ending coils of the spring. The spring seat may also comprise a tubular axial surface to support radial deformations and to ensure the spring centering.

However, shocks and vibrations exerted by the spring during the use of vehicle can damage the suspension thrust bearing.

BRIEF SUMMARY OF THE INVENTION

The aim of the invention is to provide a suspension thrust bearing with means to damp shocks and vibrations, easy to manufacture and assemble, and of increased service life.

To this end, the invention concerns a suspension thrust bearing for use with a suspension spring in an automotive suspension strut of a vehicle. The suspension thrust bearing comprises a bearing having upper and lower annular bearing members in relative rotation, and having upper and lower bearing surfaces, respectively, disposed in confronting alignment with each other. The lower bearing surface has a contour shaped to axially receive an upper end of the suspension spring. The upper bearing surface is shaped to be axially received by a support block attached to a body of the vehicle.

According to the invention, the suspension thrust bearing further comprises an upper isolator made of resilient material and fixed to the upper bearing surface such that the upper isolator fits between the upper annular bearing member and support block.

According to further aspects of the invention which are advantageous, but not compulsory, such a suspension thrust bearing may incorporate one or several of the following features:

The suspension thrust bearing comprises a bearing with an inner ring fixed to an upper cap, so as to form the upper annular bearing member of the suspension thrust bearing, and an outer ring fixed to a lower cap, so as to form the lower annular bearing member of the suspension thrust bearing.

The inner and outer rings are made from a stamped metal sheet.

The upper and lower caps are made from a rigid plastic material.

The upper and/or lower caps may comprise stiffening insert.

The bearing is a rolling bearing, the inner and outer rings defining an annular rolling chamber between them and at least one row of rolling elements being disposed within the rolling chamber.

The rolling elements are balls.

The upper annular bearing member comprises a radially-extending flange having the upper bearing surface, and an axially-extending hub having a bore.

The upper isolator comprises a radial portion fixed to the upper bearing surface, and an axial portion fixed to the bore.

The upper annular bearing member has a mechanical retention feature, the upper isolator having a complementary retention feature that mates with the mechanical retention feature to maintain the isolator in position.

Mechanical retention feature comprises one or more grooves in the upper annular bearing member.

Mechanical retention feature comprises one or more holes provided through the upper annular bearing member.

Mechanical retention feature is provided in upper bearing surface.

Mechanical retention feature is provided in a bore of upper annular bearing member.

The upper isolator is directly molded on the upper annular bearing member.

The upper isolator comprises rubber thermoplastic elastomer (TPE), in particular thermoplastic polyurethane (TPU), melt processible elastomer (MPE) or elastomer cellular foam.

The suspension thrust bearing further comprises a lower isolator made of resilient material and fixed to the lower bearing surface such that the upper isolator fits between the lower annular bearing member and suspension spring.

BRIEF DESCRIPTION OF THE SEVERAL VIEWS OF THE DRAWING

The invention will now be explained in correspondence with the annexed figures, as an illustrative example, without restricting the object of the invention. In the annexed figures.

DETAILED DESCRIPTION OF THE INVENTION

Figure 1:
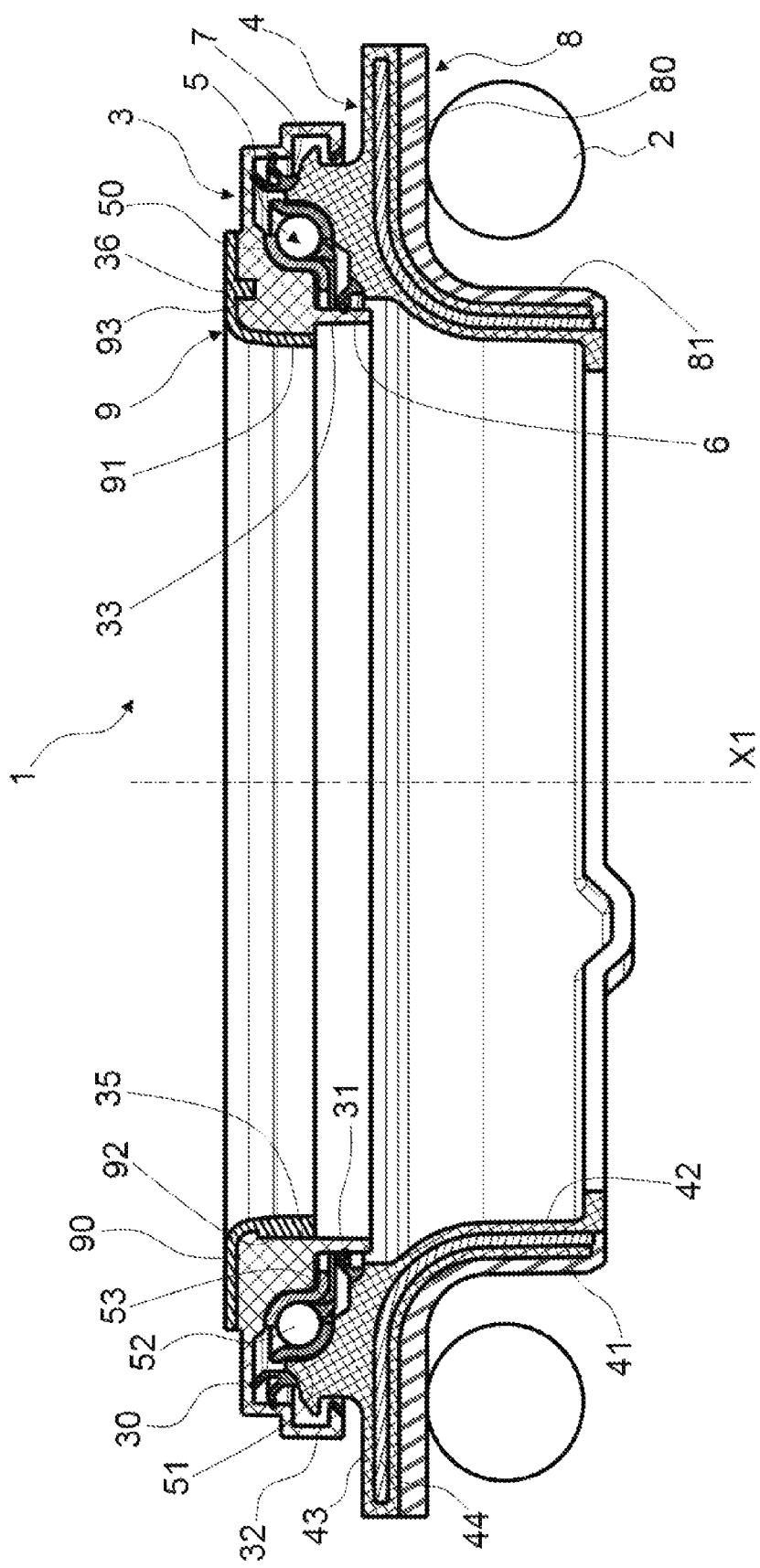
FIG. 1 is a sectional view of a suspension thrust bearing according to an embodiment of the invention.
Figure 2:
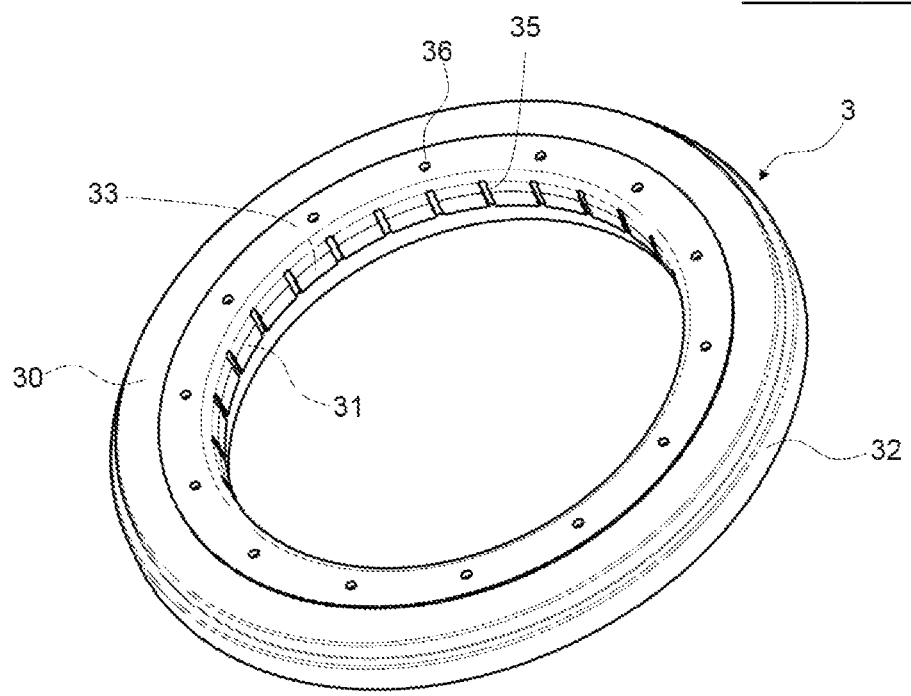
FIG. 2 is a perspective view of an upper cap of suspension thrust bearing of FIG. 1 according to the first embodiment of the invention.

According to an embodiment of the invention illustrated in FIGS. 1 and 2, a suspension thrust bearing 1 with central axis X1 is mounted between a coil spring 2 and a support block (not shown) connected to the chassis of a motor vehicle. Such suspension thrust bearing 1 can be used, for example, in an automotive MacPherson strut assembly.

Hereinafter, the adjectives "axial" and "radial" are defined relative to the central axis X1 of the annular thrust bearing 1.

The suspension thrust bearing 1 comprises an upper cap 3, a lower cap 4 and a single rolling bearing 5. In this embodiment, these three components 3, 4 and 5 are of globally circular shape about a central axis X5 coinciding with the central axis X1 when the suspension thrust bearing 1 is not loaded.

The upper cap 3 consists in a one-piece part made from plastic synthetic material, for example from polyamide, optionally reinforced with glass fibers. The upper cap 3 has a radially-extending flange 30, an inner axially-extending hub 31 of relatively small diameter and extending towards the lower side of the suspension thrust bearing 1, and an outer axially-extending skirt 32 of relatively large diameter and extending towards the lower side of the suspension thrust bearing 1.

The hub 31 defines an inner bore 33 for the suspension thrust device 1 wherein an elongate shock absorber rod (not shown) is mounted.

The upper cap 3 is dedicated to be fixed to a support block of the automotive vehicle chassis.

The rolling bearing 5 comprises a pressed sheet metal inner race 50, an outer race 51 also of pressed sheet metal, a row of rolling elements 52, here balls, and a cage 53 for maintaining a regular circumferential spacing between the rolling elements 52. The rolling elements 52 are disposed between raceways formed by toroidal portions of the inner race 50 and outer race 51.

As an alternative not shown, no rolling elements need to be used but rather the inner and outer races may directly contact each other, with a suitable low friction material, coating, or lubricant being used.

The rolling bearing 5 is integrally radially located between the inner hub 31 and the outer skirt 32 of the upper cap 3. The inner race 50 is fitted within a toroidal inner portion of the upper cap 3

The outer race 51 is fitted onto a toroidal outer portion of the lower cap 4.

The lower cap 4 comprises an axially-extending hub 41 defining an inner bore 42 wherein the rod axially extends. The outer cap 4 further comprises an outwardly projecting radial flange 43 that extends from the hub 41 towards the exterior of the suspension thrust bearing 1. The toroidal outer portion supporting the outer race 51 of the rolling bearing 51 is provided on an upper surface of the radial flange 43.

The lower cap 4 comprises a stiffening insert 44 extending along the hub 41 and the flange 43 so as to support the load and the shocks exerted by the spring 2. The stiffening insert may be in metal or in a rigid plastic. As an alternative not shown, the upper cap 3 may also comprise a stiffening insert.

Inner sealing means 6 are provided between an inner periphery of the radial portion 43 of the lower cap 4 and the inner flange 31 of the upper cap 3. Outer sealing means 7 are provided between an outer periphery of the radial portion 43 of the lower cap 4 and the outer skirt 32 of the upper cap 3.

The lower cap 4 further comprises a lower isolator device 8 made from a resilient material.

The lower isolator 8 comprises a radial portion 80 and a tubular axial portion 81. The radial portion 80 is tightly fastened to the lower side of the radial flange 43 of the lower cap 4. The radial portion 80 comprises a lower radial side for receiving an end turn of the suspension spring 2 in bearing contact.

The radial portion 80 of the lower isolator 8 supports axial load and shocks from the suspension spring 2.

The tubular axial portion 81 axially extends from the radial portion 80 towards the lower side of the suspension thrust bearing 1. The tubular axial portion 81 is tightly fastened to an outer cylindrical surface of the hub 41 of the lower cap 4.

The tubular axial portion 81 of the lower isolator 8 supports radial load and shocks from the suspension spring 2.

The tubular axial portion 81 and radial portion 80 of the lower isolator 8 are connected together so as to cover the exterior surface of the axial hub 41 and the radial flange 43 of the lower cap 4.

The lower isolator 8 is made from a resilient material, such as rubber thermoplastic elastomer (TPE), in particular thermoplastic polyurethane (TPU), melt processible elastomer (MPE) or elastomer cellular foam.

The lower isolator 8 is advantageously overmoulded onto the lower cap 4. Alternatively, the lower isolator 8 is fixed to the lower cap 4 by any suitable fixing means, such as glue.

According to the invention, the suspension thrust bearing device 1 further comprises an upper isolator 9.

The upper isolator 9 comprises a radial portion 90 and a tubular axial portion 91. The radial portion 90 is tightly fastened to the upper side of the radial flange 30 of the upper cap 3. The radial portion 90 comprises an upper radial side shaped to be received by a support block attached to the vehicle chassis. The radial portion 90 of the upper isolator 9 supports axial load and shocks.

The tubular axial portion 91 axially extends from the radial portion 90 towards the lower side of the suspension thrust bearing 1. The tubular axial portion 91 is tightly fastened to the bore of inner hub 31 of the upper cap 3. The tubular axial portion 91 of the upper isolator 9 supports radial load and shocks.

The tubular axial portion 91 and radial portion 90 of the upper isolator 9 are connected together so as to cover the exterior surface of the inner axial hub 31 and the radial flange 30 of the upper cap 4.

The upper isolator 9 is made from a resilient material, such as rubber thermoplastic elastomer (TPE), in particular thermoplastic polyurethane (TPU), melt processible elastomer (MPE) or elastomer cellular foam.

The lower isolator 9 is advantageously overmoulded onto the upper cap 3. Alternatively, the upper isolator 9 is fixed to the lower cap 3 by any suitable fixing means, such as glue.

Advantageously, the upper cap 3 comprises mechanical retention features in the form of a plurality of longitudinal grooves 35. Grooves 35 extend axially. Grooves 35 are provided in the bore 33 of inner hub 31. Advantageously, grooves 35 are circumferentially equally spaced.

The tubular axial section 91 of upper isolator 9 comprises ribs 92 shaped as complementary retention features that extend radially inwardly into the grooves 35. The upper isolator 9 is then retained with respect to the upper cap 3, any relative rotation being prevented.

Advantageously, the upper cap 3 further comprises mechanical retention features in the form of holes 36. Holes 36 extend axially and downwardly from the upper bearing surface of upper cap 3. Advantageously, holes 36 are circumferentially equally spaced.

The radial portion 90 of upper isolator 9 comprises pins 93 shaped as complementary retention features that extend axially downwardly into the holes 36. The upper isolator 9 is then retained with respect to the upper cap 3, any relative rotation being prevented. Advantageously, holes 36 may include an inner shoulder, or have a conical inner surface, so as to axially retain the upper isolator pins of complementary shape.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved suspension thrust bearing.

Moreover, various features of the above-described representative examples, as well as the various independent and dependent claims below, may be combined in ways that are not specifically and explicitly enumerated in order to provide additional useful embodiments of the present teachings.

What is claimed is:

1. A suspension thrust bearing for use with a suspension spring in an automotive suspension strut of a vehicle, the suspension thrust bearing comprising:
    a bearing having upper and lower annular bearing members in relative rotation to each other, and having upper and lower bearing surfaces, respectively, disposed in confronting alignment with each other, the lower bearing surface having a contour shaped to axially receive an upper end of the suspension spring, and the upper bearing surface being shaped to be axially received by a support block attached to a body of the vehicle, and
    an upper isolator made of resilient material and fixed to the upper bearing surface such that the upper isolator fits between the upper annular bearing member and the support block,
    wherein the bearing comprises an outer ring fixed to a lower cap, to form the lower annular bearing member of the suspension thrust bearing, the lower cap comprising an outwardly projecting radial flange, the outwardly projecting radial flange being supported by a stiffening insert located therein, the lower cap forming an inner bore located radially inward relative to the stiffening insert.

2. The suspension thrust bearing according to the claim 1, further comprises a bearing with an inner ring fixed to an upper cap, to form the upper annular bearing member of the suspension thrust bearing.

3. The suspension thrust bearing according to claim 2, wherein the upper cap comprises a second stiffening insert.

4. The suspension thrust bearing according to the claim 1, wherein the upper annular bearing member comprises a radially-extending flange having the upper bearing surface, and
    an axially-extending hub having a bore, the upper isolator comprising a radial portion fixed to the upper bearing surface, and
    an axial portion fixed to the bore.

5. The suspension thrust bearing according to claim 1, further comprises a lower isolator made of resilient material and fixed to the lower bearing surface such that the lower isolator fits between the lower annular bearing member and suspension spring.

6. A suspension thrust bearing for use with a suspension spring in an automotive suspension strut of a vehicle, the suspension thrust bearing comprising:
    a bearing having upper and lower annular bearing members in relative rotation to each other, and having upper and lower bearing surfaces, respectively, disposed in confronting alignment with each other, the lower bearing surface having a contour shaped to axially receive an upper end of the suspension spring, and the upper bearing surface being shaped to be axially received by a support block attached to a body of the vehicle, and
    an upper isolator made of resilient material and fixed to the upper bearing surface such that the upper isolator fits between the upper annular bearing member and the support block,
    wherein the upper annular bearing member has a mechanical retention feature, the upper isolator having a complementary retention feature that mates with the mechanical retention feature to maintain the isolator in position.

7. The suspension thrust bearing according to the claim 6, wherein the mechanical retention feature comprises one or more grooves in the upper annular bearing member.

8. The suspension thrust bearing according to claim 6, wherein the mechanical retention feature comprises one or more holes provided through the upper annular bearing member.

9. The suspension thrust bearing according to claim 6, wherein the mechanical retention feature is provided in upper bearing surface.

10. The suspension thrust bearing according to claim 6, wherein the mechanical retention feature is provided in a bore of upper annular bearing member.

11. A suspension thrust bearing for use with a suspension spring in an automotive suspension strut of a vehicle, the suspension thrust bearing comprising:
    a bearing having upper and lower annular bearing members in relative rotation to each other, and having upper and lower bearing surfaces, respectively, disposed in confronting alignment with each other, the lower bearing surface having a contour shaped to axially receive an upper end of the suspension spring, and the upper bearing surface being shaped to be axially received by a support block attached to a body of the vehicle, and
    an upper isolator made of resilient material and fixed to the upper bearing surface such that the upper isolator fits between the upper annular bearing member and support block,
    wherein the bearing comprises an outer ring fixed to a lower cap, to form the lower annular bearing member of the suspension thrust bearing, the outer ring comprising an outer race, the lower cap comprising an outwardly projecting radial flange, the outwardly projecting radial flange being supported by a stiffening insert located therein, the lower cap forming an inner bore located radially inward relative to the stiffening insert, and
    wherein the lower cap comprises a layer disposed between the stiffening insert and the outer race.

* * * * *